United States Patent
Chen et al.

[11] 3,719,496
[45] March 6, 1973

[54] ARTICLES OF WHITE FOOD FOR FEEDING AQUATIC ANIMALS AND METHOD OF MANUFACTURE

[76] Inventors: David T. Y. Chen, 12 Chang An Rd., E., Section 2, Taipei; Ten Fuh Shih, 45, Alley 3, Lane 16, Chung Shan Rd., Lu Chou Hsiang, Taipei Hsien, both of China /Taiwan

[22] Filed: Sept. 17, 1970

[21] Appl. No.: 73,011

[52] U.S. Cl. .................................99/2 R, 99/199 C
[51] Int. Cl. ...............................................A23k 1/00
[58] Field of Search ......99/3, 2, 199, 209, 18; 119/1; 128/272

[56] References Cited

UNITED STATES PATENTS 3,361,566   1/1968   Axelrod........................................99/3
3,528,816   9/1970   Nagae..........................................99/3

Primary Examiner—Norman Yudkoff
Assistant Examiner—Hiram H. Bernstein
Attorney—Strauch, Nolan, Neale, Nies and Kurz

[57] ABSTRACT

High protein content food for fishes and like aquatic animals is prepared by dehydrating selected worms, quickly freezing a mass of the dehydrated worms, and then freeze drying the mass.

6 Claims, 6 Drawing Figures

PATENTED MAR 6 1973          3,719,496
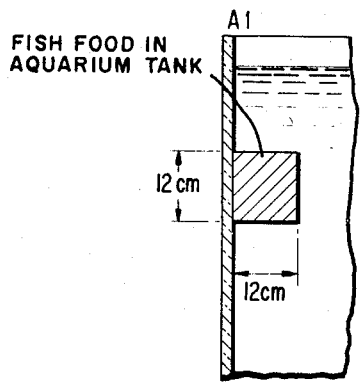
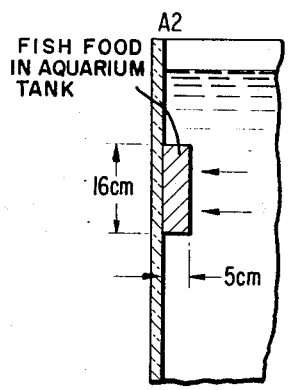
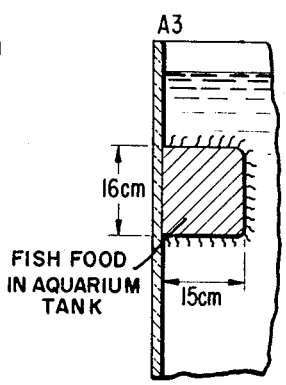
FIG. 1          FIG. 2          FIG. 3
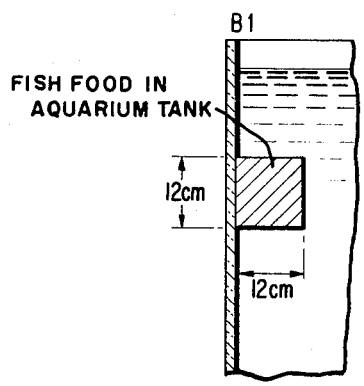
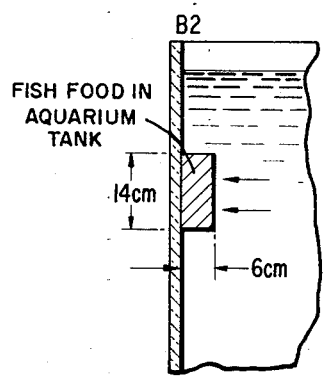
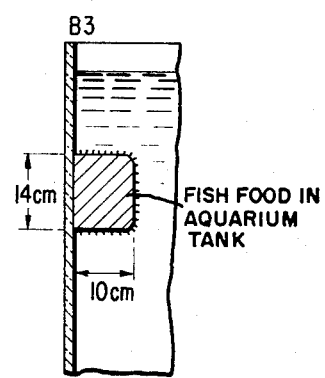
FIG. 4          FIG. 5          FIG. 6
INVENTORS
DAVID T. Y. CHEN
TEN FUH SHIH
BY Strauch, Nolan, Neale, Nies & Kurz
ATTORNEYS

ARTICLES OF WHITE FOOD FOR FEEDING AQUATIC ANIMALS AND METHOD OF MANUFACTURE

BACKGROUND AND HISTORY OF INVENTION

This invention relates to the production of food articles for feeding aquatic animals such as fish. Particularly, the raw materials are of high protein content, selected from the group of living fleshy worms consisting of tubifex worms, earth worms, mosquito larvae, brine shrimp and daphnia. The term worms as used in the claims includes all of these. From these raw materials, free and loosely bound water is removed in a desiccating plate, then they are rapidly chilled from room temperature to about −60°C, and immediately freeze-dried thereafter. The food articles thus obtained are an intact, unified, cube, white in the outer layer and red-brown inside. When moistened, the food articles absorb water quickly and effectively become as fresh as they were when alive, so they are very palatable to the feeding fish.

In recent years, due to increasing popularity in keeping and breeding aquatic animals, prepared foods for aquatic animals have been in ever increasing demand. Many workers have attempted to develop various methods of making such food articles for aquatic animals. Conventional methods of making sun-dried and heat-dried food articles proved to denature protein and destroy some of the nutrient constituents. The resultant articles also tended to disperse and foul the water in the tank when not completely eaten. This is both discouraging and unhealthy for the aquatic animals due to the increase in biological oxygen demand and the contamination of micro-organisms.

The freeze-drying techniques have been employed in making food articles for years. For example, freeze dried food articles for aquatic animals have been disclosed in U.S. Pat. Nos. 3,361,114 and 3,361,566. However, so far the food articles thereby produced have not hitherto proved entirely satisfactory.

The water content of the raw materials is a factor greatly affecting the quality of the food articles. Often, the free and loosely bound water content in the raw materials is very high, so when frozen, crystallization of the water results in the formation of tiny pockets of concentrated solution of salts, which do not themselves crystallize unless the temperature is lowered below the eutectic point. This localized high concentration of salts and the ice crystals breaks down the cells, damages the tissues and blood vessels, and denatures the protein and some of the nutrient constituents. Thus, after freeze-drying, the food articles obtained in the prior art are dark brown and the gelatin which is of adhesive importance is inactivated. If the raw materials are dead worms, which are decayed, the resulting food articles will necessarily be of very low quality.

Food articles obtained from dead worms, when introduced to the tank, are not readily acceptable for the fish and the uneaten food articles quickly disperse throughout the tank. Because the cells, tissues and blood vessels are all damaged during processing, the organic matter of the food articles leak out freely into the water in the tank. The water soon becomes cloudy, discolored and malodorous due to the heavy growth of harmful micro-organisms. The gelatin is also inactivated in these food articles, and not capable of keeping the food articles unified and adherent to the aquarium glass when moistened and pressed thereagainst.

The present invention is to obviate the drawbacks of the freeze dried food articles described above. In the present process, the raw materials are living worms such as tubifex worms collected from their native habitat. The worms are cleaned, free and loosely bound water is removed preferably without killing them, specially treated and frozen for just a few minutes and then freeze dried. The resulting food articles obtained are white, intact, unified cube which is then divided into a suitable size for a single feeding. The present process is practicable for the production of fish food articles on a commercial scale.

In the drawings,

FIGS. 1–3 illustrate diagrammatically the mode of attachment and the normal expansion of a cube of food according to the invention; and FIGS. 4–6 illustrate the same for the prior art.

The present invention in a preferred embodiment is characterized by the selection of living fleshy worms as the raw materials and in removing the free and loosely bound water from the worms by using a desiccating gypsum plate unit wherein heat is applied and the water absorbed. Advantageously the drying agents used on the gypsum plate may be calcium chloride, silica gel or silica oxide. Because the water content is greatly reduced, the time required to freeze the worms afterward is significantly shortened so that the worms can be immediately frozen as a whole and retained intact without being damaged by internal ice crystals and/or concentrated solution of salts. At the same time, due to the shock of rapid chilling, the blood vessels and muscle tissues are contracted without being destroyed. Under this processing condition, the food articles obtained are white in the outer layer, brown-red inside, and when moistened, are almost restored to the original color of the living worms and found very acceptable by the feeding fish.

Advantages of the invention are as follows:

1. Removing free and loosely bound water from the raw materials before freezing not only keeps the raw materials intact during freezing and freeze drying, but it also shortens the time required because the water content is much reduced beforehand.

2. The raw materials are kept intact in the course of processing. That is, the tissues and blood vessels are not damaged, and the protein and other organic matters are not denatured. Hence, resulting food articles are very fresh, rich in nutrient and much more acceptable to the feeding fish. The gelatin of the food articles remains activatable and able to make the food articles unified as a whole cube and adhere firmly to the aquarium glass when moistened.

3. The food articles, when introduced to the aquarium tank, absorb water quickly and are soon restored almost to the original color of the raw materials, and thus they are highly desirable to the feeding fish.

4. The freshness and nutrients of the food articles are well preserved because living fleshy worms are used as the raw materials.

5. The food articles are white and highly valued.

Other purposes, characteristics and effects of the invention are explained as follows:

PREFERRED METHODS AND RAW MATERIALS

The raw materials for the food articles of the invention for feeding aquatic animals are composed mainly of tubifex worms, earth worms, mosquito larvae, daphnia, and brine shrimp. These little worms generally survive for only a short period once collected from their native habitat. The usual method for the preparation of food articles is to freeze-dry these worms immediately after cleaning.

The present invention is different from other methods in that it uses a desiccating plate to remove free and loosely bound water from these worms in order to reduce their water content, and then chilling the worms rapidly to an extremely low temperature of about −60°C, a temperature lower than ever heretofore employed. The effects of these special treatments on the quality of the food articles may be summarized as follows:

1. The process of the invention is designed to improve the quality of the usual freeze-dried food articles for aquatic animals; to increase the durability of its preservation; and to shorten the time required for freezing the materials. The pretreatment of removing water results in so reducing the water content that the time required for freezing the materials is much shortened and that the worms can be frozen as a whole without being damaged by the internal formation of damaging ice crystals and localized high concentrations of salts. Thus damage of the cells, tissues, blood vessels, the denature of the protein and other organic matters and the browning of the food articles that are inevitable in prior conventional freeze drying processes are substantially reduced and mainly eliminated by the present process.

2. Another novelty in the process of the invention is to freeze the worms at a temperature far below eutectic point of the tissue fluid. When rapidly subjected to the extremely low temperature, the living worms vigorously contract muscle fibers and blood vessels due to the chilling-shock. This, coupled with the pre-treatment of removing water, enables the worms to keep tissues and blood vessels essentially intact during the process of freezing.

3. After removing water and freezing, the frozen worms are then freeze-dried. The resulting food articles are white in outer layer and brown-red inside, and when moistened, absorb water quickly and recapture the original color of the living worms. The texture, color, odor, taste of the food articles are almost that of the raw materials and are found very acceptable by the feeding fish.

EXAMPLE

Living fleshy worms are collected, cleaned, sorted and spread over a desiccating gypsum plate or other apparatus capable of absorbing water such as blotting paper, cement plate and drying agents to remove water.

In order to remove water from the worms without killing them, the thickness of the worms spread over on the gypsum plate should be about half that of the plate and the time required should usually be no longer than 10 to 15 minutes.

The dehydrated worms are then collected, weighed and distributed appropriately to a freezing tray. The worms to be frozen on the tray should be between one-half to one-fourth inch in thickness, but three-eighths inch is ideal. The worms are now chilled abruptly at a temperature of about −60°C for about 10 to 15 minutes. The temperature of the worms so frozen then drops to about −35°C to −40°C.

The frozen worms are immediately transferred to a drying chamber where the pressure is rapidly evacuated below 0.093 − 0.02 mm Hg, which is lower than the saturated vapor pressure of the ice at −40°C to −52°C, and thus enables the ice to sublimate at the corresponding temperature. In the course of freeze-drying, it is necessary to supply heat of sublimation to prevent the temperature from dropping even lower and to maintain the sublimation of the ice continuing. Under this condition, six to seven hours treatment is enough to freeze-dry the frozen worms. Finally, the moisture content of the resulting food articles is less than 3 percent. The food articles are then white.

When the white worms, which have been dehydrated at the desiccating gypsum plate, are quickly frozen to the temperature of −35°C to −40°C, any ice crystals formed in them are very small because of the low water content, and this results in little or no expansion in volume. Thus the skins and cell membranes of tissues of the dehydrated worms are not damaged or burst by the ice crystals during processing, and are still intact and capable of functioning as a protective barrier for preventing the infection of micro-organisms in the resulting food articles. In the prior manufacture of brown worms food articles according to processes such as those of U.S. Pat. No. 3,361,566, the water content of the fleshy worms before freezing remained very high and the worms are frozen to about −20°C. Under such conditions the cell membranes of tissues and skins of the worms were damaged or burst due to the expansion of large amounts of ice crystals formed in the worms at −5° to −10°C in the course of freezing. The food articles obtained, when exposed to air, are susceptible to decay or deterioration by oxidative rancidity and micro-organisms.

Other apparatus for absorbing water in the dehydration step may be suitable blotting paper, concrete floor, and drying agents, but the gypsum plate is the most preferable because of its low cost, high water-absorbing capacity, and its capability of being readily regenerated so as to be practicable in industrial scale use.

The following tables and the drawing set forth comparative data relative to chemical, physical properties, and the results of feeding trial with tropical fishes of the food articles prepared by the present process and other methods.

Table 1

Comparison of some properties and the results of feeding trial of food articles prepared by this process and other methods.

| FOOD ARTICLE | PROPERTIES | RESULT OF TEST |
|---|---|---|
| White food articles (Tubifex worm, the present invention) | 1. Not subjected to heat-denature during processing. <br> 2. White, intact, and water-activatable. <br> 3. Very acceptable and digestible to the | Produce better growth and feed efficiency, the feeding fish all have good growth and the length of 45 mm. in average. |

| | | |
|---|---|---|
| Brown food articles (Tubifex worm, U.S. Pat. No. 3,361,566) | feeding fish. 1. Brown in color 2. The cells and muscle tissues of the worms were partially damaged in the course of freezing and drying, thus lost its freshness. 3. Not readily acceptable by some of the feeding fish, apparently caused indigestion. | One-third of the feeding fish, due to indigestion, have grown only to the length of less than 45 mm. |

NOTE: The tropical fishes tested are 20 Angel Fish and 20 Red Sword Tail of 30 mm. in length. 10 Angel Fish and 10 Red Sword Tail were fed with white food articles of the invention, the others received brown food articles of the prior art. The feeding trial was carried out for 3 solid months.

The white food articles prepared by the process of the invention are fed to the fish in aquarium and like glass tanks, where small cubes or other masses of the article are pressed against the inside surface of the glass wall where, due to the adhesive nature of the retained natural gelatin, the masses stick to the glass surface. As each mass absorbs water from the tank it increases in volume, expanding away from the wall, and changes color. These masses during tests have been found to be almost totally devoured by the fish, so that little or no residue remains in the tank.

Table 2 below discloses the conditions shown in the drawings. FIGS. 1–3 show the invention, and FIGS. 4–6 show food particles made by processes such as U.S. Pat. No. 3,361,566 prior to the invention.

Table 2.

FIG. 1. Functional Experiment of White vs. Brown Food Articles for Aquatic Animals.

White food articles (Invention), FIGS. 1–3:
A1 — Original size of the food on the aquarium glass (1.2 cm$^2$)
A2 — The food is adhesively attached to the aquarium glass, and when pressed by the finger, is compressed to about 0.5 cm.
A3 — After 30 min. in the water, the food has expanded loosely to the size of about 1.5 cm.

Brown food articles: (U.S. Pat. No. 3361566), FIGS. 4–6:
B1 — Original size of the food on the aquarium glass (1.2 cm$^2$)
B2 — The food is adhesively attached to the aquarium glass, when pressed flat by the finger is compressed to only 0.6 cm. in thickness.
B3 — After 12 hours in the water, the food has expanded loosely only to the size of about 1 cm.

The product of the invention is a dry, non-tacky white food article in the form of a unified cube, white in outer layer and brown-red inside. When moistened it absorbs water and restores to the original color of the raw materials. The cube, when moistened and adhered to the aquarium glass, is detachable in fragments whenever required by the aquatic animals feeding thereon. While the gelatin content may be adequate usually adhesive qualities of the product are increased, so that when moistened with water it will stick to the glass of the aquarium. This is accomplished by mixing a suitable amount of adhesive substance derived from plant and animal source with the raw materials before freezing. Such additive adhesive substances include sodium alginate, propylene glycol alginate, casein, sodium caseinate, calcium carboxymethyl cellulose, sodium carboxymethyl cellulose, sodium carboxymethyl starch, sodium starch phosphate, and sodium polyacrylate.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of processing food for aquatic animals comprising the steps of dehydrating living worms to remove free and loosely bound water, immediately freezing a mass of said dehydrated worms, and then freeze drying the mass.

2. The method defined in claim 1, wherein said worms are of high protein content, being selected from the group consisting of tubifex worms, earth worms, mosquito larvae, brine shrimp and daphnia.

3. The method defined in claim 1, wherein said worms are dehydrated using a gypsum plate over which they are spread in a layer about half as thick as the plate.

4. The method defined in claim 1, wherein the dehydrated worms are quick frozen at about −60°C for about 10 to 15 minutes.

5. The method defined in claim 4, wherein the dehydrated worms are spread over a relatively thin layer in a freezing tray during quick freezing.

6. The method defined in claim 1, wherein said quick frozen worms are freeze dried in an atmosphere of about 0.093–0.02 mm mercury for about 6 to 7 hours.

* * * * *